United States Patent
Wurman et al.

(10) Patent No.: US 7,133,841 B1
(45) Date of Patent: Nov. 7, 2006

(54) METHOD AND COMPUTER SYSTEM FOR CONDUCTING A PROGRESSIVE, PRICE-DRIVEN COMBINATORIAL AUCTION

(75) Inventors: Peter R. Wurman, Raleigh, NC (US); Michael P. Wellman, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/550,964

(22) Filed: Apr. 17, 2000

(51) Int. Cl.
*G06Q 40/00* (2006.01)

(52) U.S. Cl. .............................. 705/37; 705/26; 705/27

(58) Field of Classification Search .................. 705/37, 705/26, 27
See application file for complete search history.

(56) References Cited

U.S. PATENT DOCUMENTS

| | | | |
|---|---|---|---|
| 4,799,156 A | 1/1989 | Shavit et al. | |
| 5,890,118 A | 3/1999 | Kagoshima et al. | |
| 5,905,975 A | 5/1999 | Ausubel | |
| 6,012,045 A | 1/2000 | Barzilai et al. | |
| 6,101,484 A * | 8/2000 | Halbert et al. | 705/26 |
| 6,272,473 B1 * | 8/2001 | Sandholm | 705/37 |
| 2002/0046037 A1 * | 4/2002 | Ausubel et al. | 705/1 |

FOREIGN PATENT DOCUMENTS

EP  0 828 223 A2 *  3/1998

OTHER PUBLICATIONS

Clarke, Edward H., Multipart Pricing of Public Goods, Public Choice, 1971, pp. 17-33.

Ledyard, John O., et al., Experiments Testing Multiobject Allocation Mechanisms, Journal of Economics & Management Strategy, vol. 6, No. 3, 1997, pp. 639-675.

Rothkopf, Michael H., et al., Computationally Manageable Combinatorial Auctions, DIMACS Technical Report 95-09, Apr. 1995, Rutgers University.

Groves, Theodore, Incentives in Teams, Econometrica, vol. 41, No. 4, Jul. 1973, pp. 617-630.

Kelso, Jr., Alexander S., et al., Job Matching, Coalition Formation, and Gross Substitutes, Econometrica, vol. 50, No. 6, Nov. 1982, pp. 1483-1503.

Banks, Jeffrey S., et al., Allocating Uncertain and Unresponsive Resources: an Experimental Approach, Rand Journal of Economics, vol. 20, No. 1, 1989, pp. 1-25.

Parkes, David C., iBundle: An Efficient Ascending Price Bundle Auction, 1999, pp. 1-10.

Parkes, David C., et al., Accounting for Cognitive Coats in On-Line Auction Design, 1998, pp. 1-14.

McAfee, R. Preston, et al., Analyzing the Airwaves Auction, Journal of Economic Perspectives, vol. 10, No. 1, 1996, pp. 159-175.

Demartini, Christine, et al., A New and Improved Design For Multi-Object Interactive Auctions, Mar. 15, 1999, pp. 1-43.

(Continued)

*Primary Examiner*—Jagdish N Patel
(74) *Attorney, Agent, or Firm*—Brooks Kushman P.C.

(57) ABSTRACT

A method and computer system for conducting a progressive, price-driven combinatorial auction wherein equilibrium prices supporting optimal allocation are provided. The auction mechanism allows bids on bundles and uses an innovative price setting mechanism that ensures that the bundle prices reported by the auction have the property that each participant's or bidder's tentative allocation maximizes the value reported in the participant's bid. The auction is progressive, and requires that a participant's new bid improves his previous bid in a precisely defined manner. The auction terminates when no participant submits a new bid, or according to some other specified criterion.

20 Claims, 2 Drawing Sheets

OTHER PUBLICATIONS

McMillan, John, Selling Spectrum Rights, Journal of Economic Perspectives, vol. 8, No. 3, 1994, pp. 145-162.

Vickrey, William, Counterspeculation, Auctions, and Competitive Sealed Tenders, Journal of Finance, vol. 16, 1961, pp. 8-37.

Bikhchandani, Sushil, et al., Competitive Equilibrium in an Exchange Economy With Indivisibilities, Journal of Economic Theory, 1997, vol. 74, pp. 285-413.

* cited by examiner

METHOD AND COMPUTER SYSTEM FOR CONDUCTING A PROGRESSIVE, PRICE-DRIVEN COMBINATORIAL AUCTION

GOVERNMENT RIGHTS

This invention was made with government support under Grant No. F 30602-97-1-0228 awarded by the United States Air Force. The government has certain rights in the invention.

TECHNICAL FIELD

This invention relates to methods and computer systems for conducting progressive, price-driven combinatorial auctions.

BACKGROUND ART

The recent U.S. FCC auctions in electromagnetic spectrum have kindled interest in mechanisms that allocate bundles of discrete, complementary resources, and is of direct relevance to e-commerce applications. The FCC and its consultants expected that the licensees would see significant synergies from operating the same spectrum bands in geographically contiguous regions of the country, or contiguous bands in the same region. However, the mechanism designers employed by the FCC developed the Simultaneous Ascending Auction (SAA) (McMillan, 1994; McAfee and McMillan, 1996), which received very positive press when it generated billions of dollars of revenue for the U.S. government. The SAA allocates resources by operating a first-price auction for each resource. The auctions are synchronized, and the mechanism enforces an eligibility constraint that restricts bidders from bidding on more items than they had "active" bids (i.e. winning or newly submitted) in the previous round.

However, recent studies have shown that combinatorial auctions, which permit bids on combinations of items, can perform significantly better than the SAA. It is well known that when bidders have complementary preferences, price equilibria may not exist. That is, there may not be prices on individual objects that support the optimal allocation. One example is reproduced in Table 1. The efficient allocation is indicated with an asterisk.

TABLE 1

An example without equilibrium prices for individual goods.

|  | A | B | AB |
|---|---|---|---|
| Bidder 1 | 0 | 0 | 3* |
| Bidder 2 | 2 | 2 | 2 |

Economists have studied the conditions under which price equilibria exist. For example, it has been shown that price equilibria exist if a gross substitutability condition holds (Kelso and Crawford, 1982), or if utility functions satisfy the no-complementarities condition (Gul and Stacchetti). Bikhchandani and Mamer (1997) demonstrated that equilibria exist if the total value of the solution to the discrete allocation problem is equal to the value of the corresponding relaxed linear optimization problem. In these cases, a simple market structure in which each object is sold in independent auctions can lead to the efficient outcome.

When the above conditions do not hold, we must resort to more complex auction mechanisms to achieve the desired outcomes. The benchmark allocation mechanism is the Generalized Vickrey Auction (GVA).

Generalized Vickrey Auction

The GVA is an incentive compatible, efficient, and individually rational direct revelation mechanism. Each bidder submits its utility function, and the auction computes the optimal allocation and charges each bidder a payment. The bidder's payment, $\pi_i$, is the impact that its presence has on the welfare of the other bidders.

$$\pi^i = V(f^{*(I/i)}) - [V(f^*) - v_i(f_i^*)],$$

where $f^{*(I/i)}$ is the optimal solution to the problem of allocating the resources when i is excluded, V is the total valuation of the indicated solution, and $v_i$ is bidder i's valuation for the resources allocated to it in the indicated solution.

The GVA extends the intuition gained from Vickrey's (1961) seminal work, and results by Clarke (1971) and Groves (1973) in general allocation problems. The mechanism's incentive compatibility property follows from the fact that its bid determines what the bidder gets, but not how much it pays (or receives).

The GVA has several drawbacks that inhibit its use in practice. The main imperfection of the GVA is that it is not budget-balanced. It may be necessary for the auctioneer to subsidize the auction in order to get both buyers and sellers to bid truthfully.

A second weakness, highlighted by Banks et al. (1989) is that the GVA requires that each participant specify her utility function, which (potentially) requires that she report $2^n-1$ values. If the preferences cannot be expressed in a compact form, this requirement may make the GVA impractical. In addition, when participants reveal their true preferences they may leave themselves open to manipulation by an unscrupulous auctioneer (seller). For example, a common manipulation used by sellers in an English auction involves using a "shill" who tries to bid up the highest bidder even after the second highest real bidder has dropped out.

In many cases it may be costly for bidders to determine their true valuations for every possible combination of items, the majority of which play no role in determining the solution. Parkes et al. (1998) argue that the cognitive costs of accurately determining one's true valuation is a major factor in the predominance of the English auction online—a participant needs an accurate appraisal of its value for a good only if it is still in the running near the end of the auction.

A third objection to using the GVA in practice is that, even in the one-sided case, it computes discriminatory payments. That is, if, at the end of the auction, the auctioneer were to announce the allocations and payments computed by the mechanism, some bidder may desire another's bundle. This can be seen in the example in Table 2, in which the items A and B could be two different units of the same resource.

TABLE 2

An example in which the GVA payments are discriminatory.

|  | A | B | AB |
|---|---|---|---|
| Bidder 1 | 5* | 5 | 7 |
| Bidder 2 | 5 | 5* | 8 |

The GVA payments are $\pi^1=\$3$, and $\pi^2=\$2$. Even though (by incentive compatibility) no course of action would have made bidder 1 better off than truth-telling, he would still envy bidder 2.

Combinatorial Auction Designs

Several alternatives to the GVA have been suggested. One major distinction among the candidates is whether or not they allow bundle bids.

The motivation for permitting bundle bidding is to combat the exposure problem (Rothkopf et al., 1998). Without bundle bids, bidders who have superadditive valuations are forced to either bear risk or bid over-cautiously. Suppose, for example, bidder i has a valuation for the bundle AB that exceeds the sum of its value for A and B alone. If bidder i offers no more for either A or B than their individual values, the bidder may fail to purchase the bundle even when the combined cost is under its valuation. On the other hand, if i is less conservative, it can offer more than its value for one of the goods. The strategy exposes the bidder to potential losses if, in the end, it gets only one item and pays more than its value for that individual item.

Allowing bundle bids introduces the free rider problem (Rothkopf et al., 1998), in which bidders buying smaller bundles need to collaborate to displace a larger bundle bidder. Consider the situation where bidder 1 values A at $5, bidder 2 values B at $4, and bidder 3 values AB at 7. Suppose bidder 3 has offered $6 for AB. Neither bidder 1 nor bidder 2 can displace bidder 3 without taking a loss. In order to displace bidder 3, the two bidders have to collaborate. However, the more that bidder 2 bids, the less bidder 1 will have to contribute to displace bidder 3. The same logic holds for bidder 2. Thus, the two bidders have an incentive to free ride on each other, which could lead to a coordination failure and an inefficient outcome.

Banks et al. (1989) proposed an iterative mechanism, called the Adaptive User Selection Mechanism (AUSM), that allows bundle bids. AUSM posts the current best allocation on a bulletin board visible to all of the participants. To become part of the current best allocation, a new bid has to offer more than the sum of all of the bids it displaces. Bids that are not part of the best allocation are posted in a publicly-displayed standby queue designed to facilitate the coordination of two or more smaller bidders combining on a new bid large enough to displace a larger bidder. However, posting bids on a standby queue reveals information about the bidders that they may prefer not to reveal.

Both SAA and AUSM have complex strategy spaces and have so far proved intractable to game-theoretic analysis. Ledyard et al. (1997) executed a series of controlled experiments to investigate the performance of three mechanisms: sequential ascending bid auctions, the SAA, and AUSM. In problems the authors classified as "hard"—involving significant complementarities and a range of solutions— AUSM significantly outperformed the other two mechanisms. This led the authors to conclude that, when there are complementarities, mechanisms that allow package bidding will perform better. This seems to have been taken to heart by the FCC and its consultants, and the current recommendation is that the FCC should explore mechanisms that allow bidders to bid on bundles (CRA, 1998).

Recently, Demartini et al. proposed the Resource Allocation Design (RAD) (DeMartini et al., 1998), which combines features of AUSM and SAA. RAD allows bidders to place bids on bundles, then computes the locally efficient allocation. In this situation, the locally efficient allocation is also revenue maximizing.

A linear program is solved to generate approximate prices, and a beat-the-quote rule is used. Bidders need to maintain eligibility by continuing to win items, or by submitting new bids.

In experimentation with Cal Tech students, RAD averaged more efficient solutions in fewer iterations than either AUSM or SAA. However, RAD has shortcomings of its own. One problem that plagued both SAA and RAD was that some bidders lost money. This turned out to be a side effect of the eligibility rule. In order to maintain eligibility in future rounds, participants often placed low bids on items they didn't really want, but which they ended up winning anyway. A second drawback of RAD is that the prices computed by the linear program are not guaranteed to be separating prices. This makes it difficult for bidders to determine whether they are winning.

Another ascending auction that is being investigated is iBundle (Parkes, 1999). iBundle allows bids on bundles and computes the locally efficient allocation. It associates payments with bundles, in effect, announcing a payment lattice as a price quote. There are three variations of iBundle, which differ based on the manner in which payments are computed: iBundle(2) announces anonymous payments to every bidder, iBundle(3) announces discriminatory payments, and iBundle(d) announces discriminatory payments for some bidders, and anonymous payments for the rest. In all three versions, the auction ends when no bidders submit new bids, and the winners pay the price for their bid.

In both RAD and iBundle, the winners pay the exact amount of their bids. In general, charging bidders their bids has an undesirable property, namely, that it may not correspond to a payment equilibrium—at the final payments, a bidder may wish to purchase a bundle other than the one allocated.

Consider a simple example where bidder 1 has bid $5 for A, $4 for B, and $7 for the bundle AB. Bidder 2 offers $2 for A, $3 for B, and $6 for AB. The bids are diagrammed in Table 3.

TABLE 3

An example in which charging bid payments is not an equilibrium.

|  | A | B | AB |
|---|---|---|---|
| Bidder 1 | 5* | 4 | 7 |
| Bidder 2 | 2 | 3* | 6 |

The optimal allocation assigns A to bidder 1 and B to bidder 2. Suppose we have reached the end of the auction and that these bids actually represent the bidders' true valuations for the items. If we charge each bidder its bid, then bidder 1 will pay $5 for A, and bidder 2 will pay $3 for B. At these payments, bidder 1 would rather buy B than A, because that would provide her with a surplus of $1, whereas purchasing A for $5 leaves her no surplus.

The U.S. patent to Ausubel U.S. Pat. No. 5,905,975 discloses a dynamic combinatorial auction system which allows for combinations of items. The system runs a very large number of simultaneous ascending auctions which results in the GVA prices. Thus, the Ausubel's system does not produce uniform prices which can be revealed to all of the participants.

The following U.S. patents are only generally related to the present invention: Barzilai et al. U.S. Pat. No. 6,012,045; Shavit et al., U.S. Pat. No. 4,799,156; and Godin et al., U.S. Pat. No. 5,890,118.

DISCLOSURE OF INVENTION

An object of the present invention is to provide a method and computer system for conducting a progressive, price-driven combinatorial auction wherein equilibrium prices supporting the optimal allocation are provided.

Another object of the present invention is to provide a method and computer system for conducting a progressive, price-driven combinatorial auction wherein upper and lower bundle equilibrium prices supporting optimal allocation are provided.

In carrying out the above objects and other objects of the present invention, a method for conducting a progressive, price-driven, combinatorial auction of items is provided. The method includes: (a) receiving at a computer site bids for the items being auctioned from a plurality of bidders. Each of the bids represents at least one bundle of items and at least one associated offer price. The method also includes: (b) calculating an interim allocation of bundles to bidders that maximizes or approximates a total value of winning bids, and (c) calculating an interim winning price for each bundle in the initial allocation. The method further includes: (d) transmitting the interim allocation and the interim winning prices to the bidders, and then (e) receiving upwardly-revised bids from the bidders. The method still further includes: (f) calculating a revised, interim allocation of bundles to bidders and a revised, interim winning price for each bundle in the revised, interim allocation based on the revised bids, and (g) transmitting the revised, interim allocation and the revised, interim winning prices to the bidders. Then (h), steps (e) through (g) are repeated until a termination criterion is satisfied. The method finally includes: (i) declaring the last revised, interim allocation and the last revised, interim winning prices as an auction result after termination of the bidding process.

Preferably, interim prices are determined for one or more unallocated bundles based on the interim winning prices, and the interim prices are transmitted for the one or more unallocated bundles to the bidders.

The items may be all products or all services or a combination of at least one product and at least one service.

The computer site is preferably a Web site.

The auction may end at a fixed or undetermined period of time after the auction begins.

The step of calculating an interim winning price for each bundle in an interim allocation preferably includes the step of constructing an instance of the assignment problem.

Further, in carrying out the above objects and other objects of the present invention, a computer system for conducting a progressive, price-driven, combinatorial auction of items is provided. The computer system includes a set of related documents and associated files. The computer system also includes a server for serving up the set of related documents and associated files to a plurality of I/O devices to provide bidders with capability to participate in the auction. The server is programmed with application software to carrying out the method as described by steps (a) through (i) above.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
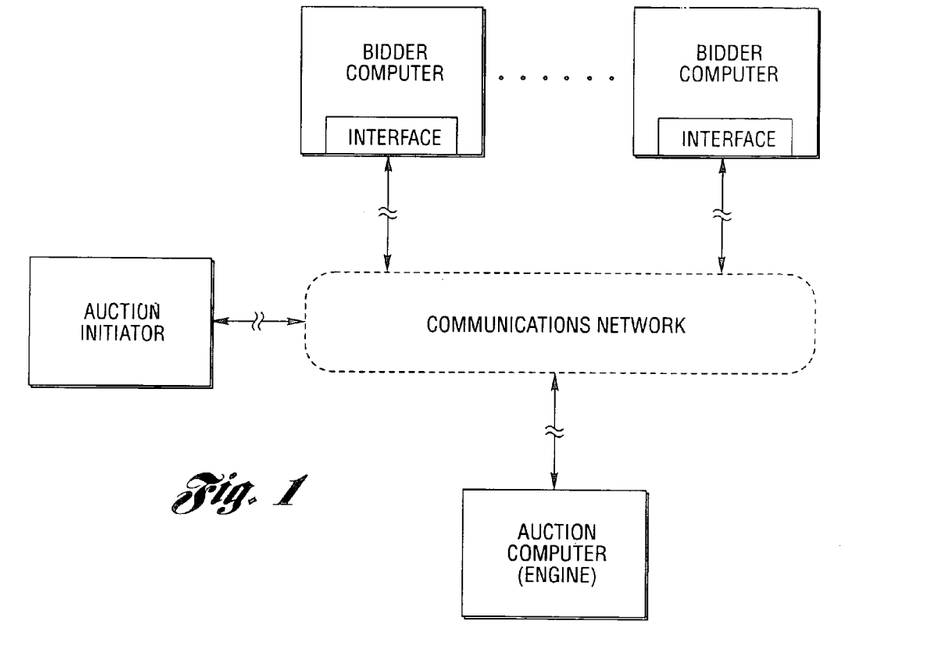
FIG. 1 is a schematic environmental view illustrating the computer site of the present invention.

A particular embodiment of the invention is provided herein in the form of a mechanism called the Ascending k-Bundle Auction (AkBA). To implement the AkBA, the following elements are important as illustrated in FIG. 1:

1. A computer interface of a computer (or other I/O device) where users (henceforth, termed bidders) specify their bids for submission to the auction;

2. A communications network over which bids are transmitted from the bidders' interface to the auction engine; and 3. An auction engine within a computer that receives bids from the bidder interfaces, performs calculations implementing the AkBA rules, and transmits status information (termed price quotes) and final results to the bidders over the communications network.

The following description assumes that the identities of goods and/or services being auctioned has been specified by the party setting up the auction (henceforth, the auction initiator of FIG. 1), and communicated to potential bidders through bidder interfaces or other means. The auction initiator also defines the currency units employed, timing parameters, and other features of the specific auction instance.

Bidder Interface

Each bidder interface typically is provided by a computer program by which bidders specify bundles of basic goods being auctioned and associated offer prices. The interface may include text input forms and/or graphical elements, the important feature being that the bidder can select a particular subset of goods to designate as a bundle, and indicate the price at which it is willing to buy that bundle. The association of a particular bundle and a price is referred to as "an offer".

For example: <{A, B, C}, $5>. This is an offer to buy the bundle of goods including A, B, and C at a price of $5.

A "bid" comprises a collection of offers. Each bidder interface may also support convenient means to specify combinations of related offers. For instance, indicating that any of a set of offers can be combined at the sum of their respective prices. For example, the offer <{D,E}, $8> might be designated as combinable with the example offer above to yield the additional offer <{A,B,C,D,E>}, $13>. (If they are not designated as combinable, the auction treats the offers as exclusive of each other.)

Once the bidder has specified a collection of offers, the bid may be transmitted to the auction by a command invoked on the bidder interface.

The bidder also uses the interface to receive information from the auction engine, such as notification of admission or rejection of bids, status information in the form of price quotes or other form, and notification of auction results.

The bidder interface may also provide facilities for viewing the bidder's current offers, as well as editing them for submission in another round of bidding.

Communications Network

Any network will do such as a computer network like the Internet.

Auction Engine

The auction engine of the auction computer performs calculations on bids, conceptually organized into rounds. The key operation is calculating a set of prices for relevant bundles. This operation is described in detail, and then how it fits in the overall auction process as illustrated by the block diagram flow chart of FIG. 2.

Price Calculation Operation

Figure 2:
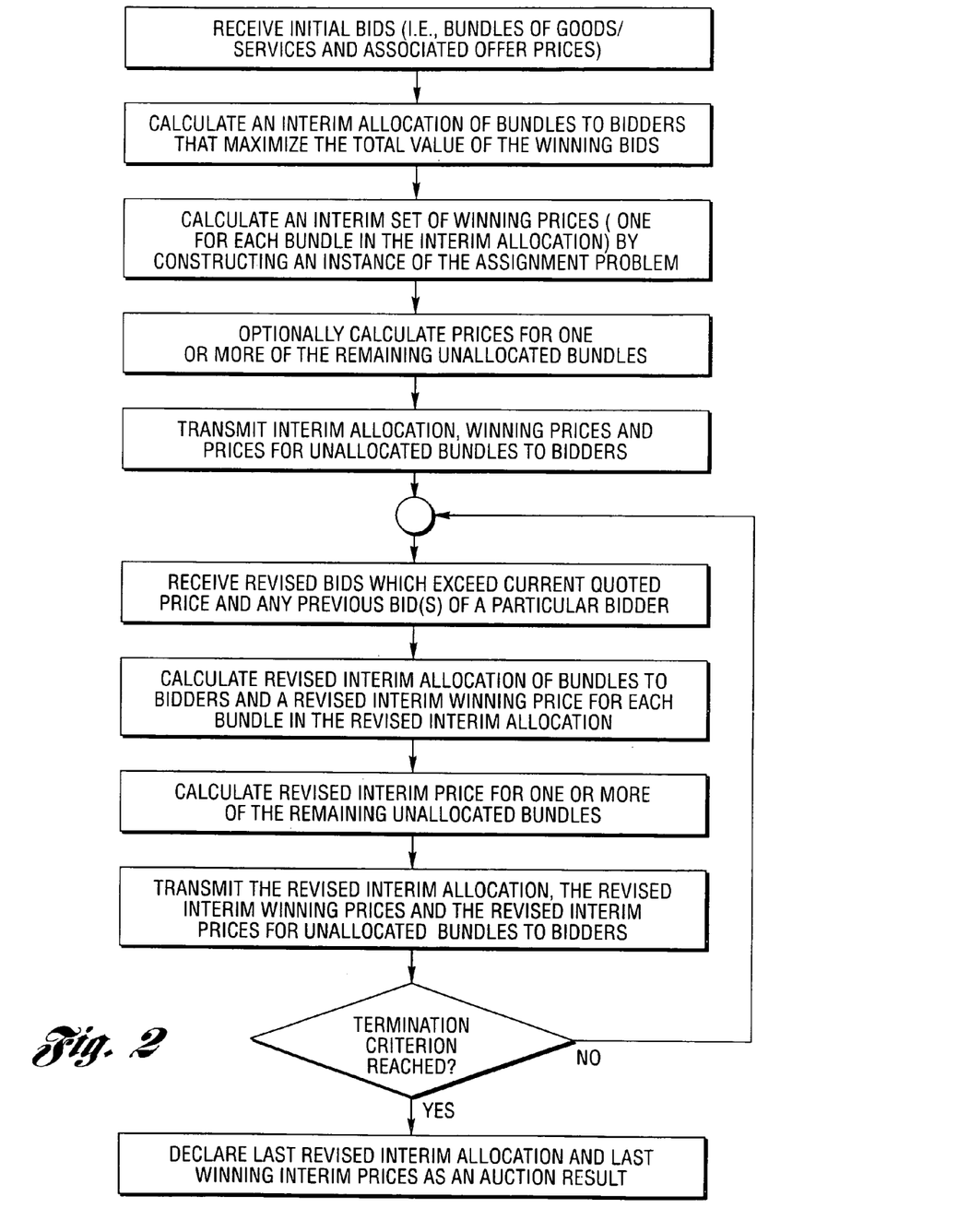
FIG. 2 is a block diagram flow chart illustrating the method of the present invention.

Step 1: Determine the allocation of bundles to buyers that maximizes the total value of winning offers. This can be calculated using any of several available "winner determination" algorithms. Examples include CASS (Fujishima et al., 1999), Sandholm's algorithm (Sandholm, 1999), dynamic programming, integer programming (Ygge et al., 2000), etc. Alternatively, the maximizing allocation can be approximated using any of several, well-known approximation algorithms.

Step 2: Construct an instance of the "assignment problem" (a well known optimization problem) based on the allocation determined in Step 1. Specifically, this instance includes the winning bidders and their associated bundles from this solution, and the non-winning bidders and dummy goods. The values each of these bidders associates with each of these bundles can be inferred straightforwardly from its offers. The values that all bidders have for the dummy goods is zero. Use these values to formulate the dual linear programs expressing minimal and maximum shadow prices for the original assignment problem. These can be solved using any method for linear programming.

The result of Step 2 is a set of prices, one for each bundle in the "winning" allocation. One can use either the minimal or maximal prices, or any linear combination. (The choice of which was specified by the auction initiator. Linear combinations are indicated by setting a weighting parameter, "k", between 0 and 1.)

Step 3: Using the prices calculated in Step 2, and the existing bids, determine prices for all of the remaining, unallocated bundles. This can be done for any bundle by calculating the lowest price such that no bidder would gain strictly more surplus from this bundle than from that which it is assigned in Step 2 (at the Step 2 price).

Step 3 need not be performed explicitly for every bundle (and probably should not, as there are an exponential number of bundles). Instead, it can be computed on demand for any given bundle.

End Price Calculation

The overall procedure implemented by the auction engine works as follows:

A. Initialize all bundle prices to zero.

B. Repeat until termination criterion is satisfied.

B1. Receive bids. Admit bids (or incremental offers) meeting constraints specified in bidding rules (discussed below).

B2. Perform price calculation operation based on current set of bids. Notify bidders of revised allocation (step 1), revised winning prices (step 2), and (optionally, or on demand), the revised prices on other bundles.

C. Report/implement final allocation and prices as auction result.

Each iteration of Step B is termed a round. Transition from phase B1 (receiving bids) to B2 (price calculation) is triggered according to criteria specified by the auction initiator, for example a fixed length of time, receipt of some number of revised bids, or some combination thereof. The auction initiator similarly specifies a termination criterion, such as a fixed number of rounds, amount of time, or until no buyer submits a revised bid.

Bidding rules dictate what bidding actions are admissible during a round. Typically, a revised bid will comprise a set of offers, to be added to existing offers, or replace offers for bundles. In order to ensure progressivity, the bidding rules should require that each offer: (1) exceeds the current quoted price for that bundle, and (2) exceeds any previous offer by that bidder for that bundle or a subsuming bundle.

Equilibrium Price Calculations

The present invention provides a method and computer site for conducting a progressive, price-driven combinatorial auction. The auction is an ascending auction that allows bids on bundles and has the property that the payments or winning prices announced at the end of the auction correspond to a payment equilibrium which is variant of price equilibrium, both of which are defined as follows.

Price Equilibrium: In a price equilibrium, bidders behave as if prices are determined exogenously and are unaffected by the bidder's own messages. Let $f_i$ be the bundle allocated to bidder i in solutions and let X be the set of all possible bundles. Under quasilinear preferences, a solution, f, and price vector p form a price equilibrium if for all i:

$$v_i(f_i) - p \cdot f_i = \max_{x \in X}[v_i(x) - p \cdot x]. \quad (1)$$

Payment Equilibrium. Payment equilibrium is a variant of price equilibrium for mechanisms with nonlinear prices. Here we present a simplified definition appropriate to the buyer's optimization problem. Under quasilinear preferences, a solution, f, and payment lattice, $\pi$, form a payment equilibrium if:

$$v_i(f_i) - \pi_f = \max_{x \in Z}[v_i(z + e_i) - \pi_z]. \quad (2)$$

The primary distinction between the payment and price equilibrium concepts is that the cost of acquiring a bundle is not fixed by the costs of the individual items. A payment equilibrium that supports the efficient allocation always exists with the present invention as described herein.

Equilibrium Payments

Construction

Assume that f* is the efficient allocation, and $v_i(b)$ is bidder i's valuation for bundle b. When bidders have valuations that are monotone on the finite lattice B, equilibrium payments exist that support the efficient allocation. Such equilibrium payments can be found by constructing them in a three-step procedure. First, find the efficient allocation, f*. Next, compute payments on the bundles that are allocated in f*. Finally, compute payments on the unallocated bundles.

Step 1. The socially efficient allocation satisfies the following maximization problem:

$$\max \sum_i \sum_b v_i(b)\delta_{ib} \, s.t. \sum_b \delta_{ib} \leq 1, \quad (3)$$

$$\forall i,$$

$$\sum_b \sum_i \delta_{ib} b_j \leq 1,$$

$$\forall j,$$

$$\delta_{ib} \in \{0, 1\},$$

where $\delta_{ib}=1$ iff b is allocated to i, and $b_j=1$ iff $j \in b$. The first constraint implies that each bidder receives at most one bundle. The second constraint ensures that no item is allocated more than once.

Let f* be a solution to this integer program. The value of the solution is V(f*).

Step 2. $I_\Theta$ is the set of bidders who receive items in f*, that is, $I_\Theta = \{i | f_i^* \neq \emptyset\}$. The set $I\neg_\Theta$ denotes the bidders who receive nothing, $I\neg_{\Theta = I/\Theta}$. Let $B_\Theta$ be the subset of bundles which are assigned in f*, and $B_\sigma$ be the unassigned bundles. For each bidder $i \in I\neg_\Theta$, introduce a null item $\phi_i$ which represents the bidder's null allocation. Let $\Phi \equiv \{\phi_i | i \in I\neg_\Theta\}$. Every bidder has a valuation of zero for every element of $\Phi$.

Let $G = B_\Theta \cup \Phi$, and $g \in G$. G, along with the corresponding bidder valuations, describes an assignment problem (Shapley and Shubik, 1972). In the context of AkBA, it is referred to as the assignment subproblem because in the process of formulating it, information about the original allocation problem is discarded. Note also, the solution, f*, from Step 1 is already in hand.

$\pi_g$ is now computed for all g that support the solution to the assignment subproblem. To accomplish this, the dual program used by Leonard (1983) is employed to compute minimal payments for assignment problems. Let $LP_{lower}$ be the following linear program:

$$\max \sum_g \pi_g \, s.t. \, s_i + \pi_g \geq v_i(g), \quad (4)$$

$$\forall i,$$

$$g,$$

$$s_i, \pi_g \geq 0,$$

$$\sum_i s_i + \sum_g \pi_g = V(f^*).$$

The last constraint ensures that the first constraint is satisfied at equality for the optimal assignment.

The $s_i$ term represents the surplus achieved by bidder i. $LP_{lower}$ maximizes each bidder's surplus within the range of equilibrium payments that support the optimal solution to the assignment subproblem. Note that the introduction of the items in $\Phi$ is simply a trick to include the bidders in $I\neg_\Theta i$ the assignment subproblem. In the solution, $s_i=0$ and $\pi_{\phi i}=0$ for all $i \in I\neg_\Theta$, $LP_{lower}$ has a complementary program, $LP_{upper}$, which computes upper bound payments:

$$\max \sum_i s_i \, s.t. \, s_i + \pi_g \geq v_i(g), \forall i, g, \quad (5)$$

-continued $$s_i,$$

$$\pi_g \geq 0,$$

$$\sum_i s_i \sum_g \pi_g = V(f^*).$$

Clearly, the payment vector produced in finding a solution to either $LP_{lower}$ or $LP_{upper}$ is a payment equilibrium for the assignment subproblem—the first constraint requires that a bidder cannot gain any more surplus from another assigned bundle than it receives from the one allocated to it.

Step 3. Given a solution to either $LP_{lower}$ or $LP_{upper}$, the next step is to set payments on the bundles in $B_\phi$. This can be done as follows. For all $b \in B_{100}$, $$\pi_b = \max_i [v_i(b) - s_i]. \quad (6)$$

Properties

Property 1. The bundle payments, $\underline{\pi}^*$, computed by $LP_{lower}$ and (6), support the efficient allocation.

Property 2. The bundle payments, $\overline{\pi}^*$, computed by $LP_{upper}$ and (6), support the efficient allocation.

Property 3. The payment lattice computed by $LP_{lower}$ and (6), or by $LP_{upper}$ and (6), is monotone when bidder valuations are monotone on B. Let $\overline{\pi}^*$ be a lattice of payments calculated by $LP_{upper}$ and (6). Similarly, $\underline{\pi}^*$ is the payment lattice resulting from solving $LP_{lower}$ and applying (6). A range of equilibrium payments that support the optimal allocation is now considered.

Property 4. For all $k \in [0,1]$, $k\overline{\pi}^* + (1-k)\underline{\pi}^*$ is a payment equilibrium. The k parameter here is directly analogous to the parameter used in the k-double auction (Satterthwaite and Williams, 1989). $\overline{\pi}^*$ and $\underline{\pi}^*$ bound the range of payments for which supply equals demand. Reducing any payment in $\underline{\pi}^*$ would create excess demand for some of the items. There is a slightly weaker analogy for the upper bound side. One cannot raise the payment of any $b \in B_\Theta$ without disequilibrating supply and demand. However, in some cases one can increase the payments of bundles in $B_\phi$ without adverse affects.

EXAMPLE

Consider the example in Table 4. The efficient allocation is to assign AB to bidder 2 and C to bidder 1. Bidder 3 gets nothing. This allocation has a social welfare of 13.

TABLE 4

An example with three bidders.

| | A | B | C | AB | AC | BC | ABC |
|---|---|---|---|---|---|---|---|
| Bidder 1 | 6 | 6 | 5* | 10 | 7 | 8 | 12 |
| Bidder 2 | 3 | 3 | 2 | 8* | 5 | 6 | 11 |
| Bidder 3 | 4 | 2 | 1 | 7 | 6 | 5 | 10 |

In order to construct equilibrium payments, the dummy good $\phi_3$ is introduced. Now, solve the linear programs $LP_{lower}$ and $LP_{upper}$ for the assignment subproblem in Table 5.

TABLE 5

The assignment problem

|          | AB | C | 100₃ |
|----------|----|----|------|
| Bidder 1 | 10 | 5 | 0 |
| Bidder 2 | 8  | 2 | 0 |
| Bidder 3 | 7  | 1 | 0 |

The solution to $LP_{lower}$ for this problem is $\pi_{AB}=1$, and, of course, $\pi_{\varphi 3}=0$. This leaves $s_1=4$, $s_2=1$, and $S_3=0$. The final upper and lower equilibrium payment vectors are given in Table 6.

TABLE 6

Equilibrium payments.

|            | A | B | C | AB | AC | BC | ABC |
|------------|---|---|---|----|----|----|----|
| $\bar{\pi}^*$   | 4 | 4 | 3 | 8  | 6  | 6  | 11 |
| $\underline{\pi}^*$ | 4 | 2 | 1 | 7  | 6  | 5  | 10 |

Figure 3:
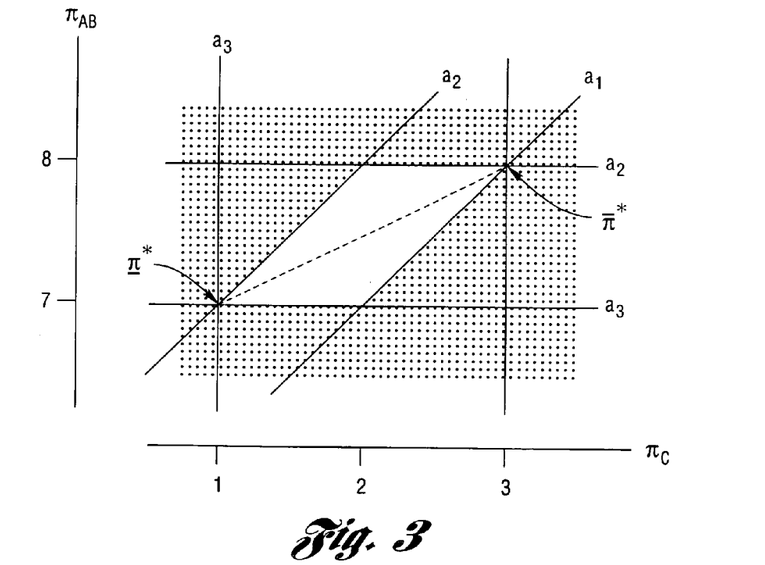
FIG. 3 is a graph illustrating the space of possible equilibrium payments for the example in Table 4; the dashed line indicates the range of k-bundle prices.

FIG. 3 is a graph that shows the binding linear constraints for this example projected into the space $\pi_{AB} \times \pi_C$. The constraints are labeled with the bidder whose valuations impose them (i.e. $a_1$ corresponds to bidder 1). The white area is the space of equilibrium prices, and the dashed line between $\bar{\pi}$ and $\underline{\pi}$ are the k-bundle prices.

Notice that $\bar{\pi}^*_C$ is less than $v_1(C)$. In Table 4, bidder 1 values AB at $10, while bidder 2 values it at $8. However, in the efficient allocation, bidder 2 receives AB. To make bidder 1 satisfied with this outcome, the bidder's surplus is increased by reducing the price of its allocation. Ironically, this situation arises only when bidders have subadditive preferences. Although complementarities motivate one to permit bundle bidding, it is subadditivity that provides a challenge when constructing equilibrium payments.

The Family of k-Bundle Auctions

The construction of equilibrium payments in the context of an omniscient mediator is described above. The methodology can be adapted for use within an auction.

Definition 1. The function $\gamma_{kb}$ assigns a payment to each element of the lattice B according to the formula $k\bar{\pi}^* + (1-k)\underline{\pi}^*$, where $k \in [0,1]$ and the computation of $\underline{\pi}^*$ and $\bar{\pi}^*$ by applying (3), $LP_{lower}$, $LP_{upper}$, and (6) to the bidders' bids.

One can combine the $\gamma^{kB}$ with a full set of auction parameters described in Table 7 (restricted in that $\gamma^{kB}$ is defined for only the single-seller case), which provides a summary of the parameters and their possible values for discrete-good auctions.

TABLE 7

Bidding Rules

| | |
|---|---|
| Expressiveness | Any language that permits the expression of offers for bundles of goods |
| Bid Dominance | Ascending |
| Beat-the-quote | Buyer |
| Information Revelation | |
| Price Quotes | Price lattice, or subsets thereof |
| Quote Timing | None, enumerated, random, activity, inactivity, or by request |
| Order Book | Closed, current winners, open |

TABLE 7-continued

Clearing Policy

| | |
|---|---|
| Clear Timing | Enumerated, random, activity, inactivity |
| Closing Conditions | Fixed time, random, inactivity, designated bids, equilibrium signal |
| Tie Breaking | Arbitrary, earliest |
| Auctioneer Fees | Entrance, bid fee, ad valorem, nonlinear |

This gives potentially hundreds of new auction types to explore. While the present invention relates to an ascending k-bundle auction, to gain some insight into the incentives bidders face under this pricing scheme, sealed bid variants are first discussed hereinbelow.

Sealed-Bid k-Bundle Auctions

The sealed-bid k-bundle auction accepts bids that express, directly or indirectly, a willingness-to-pay value for each bundle. At a prespecified time, the auction computes the payments or winning prices and allocation using $\gamma^{kB}$.

First, consider the sealed-bid bundle auction where k=0. Although $LP_{lower}$ produces the GVA payments for the assignment subproblem (Leonard, 1983), it is not necessarily true that these payments are equivalent to the GVA payments for the original problem. In the example in Table 2, the GVA payments are $3 for bidder 1, and $2 for bidder 2. However, $\underline{\pi}^*=(0,0,3)$ for this problem.

Therefore, we would not expect the k=0 bundle auction to be incentive compatible. The following example shows how the auction can be manipulated. Consider the example in Table 8.

TABLE 8

An example with multiple equilibrium bundle payment vectors.

|          | A  | B  | AB |
|----------|----|----|----|
| Bidder 1 | 0  | 0  | 3  |
| Bidder 2 | 2* | 2  | 2  |
| Bidder 3 | 2  | 2* | 2  |

Assume that bidders 2 and 3 reveal their true valuations. Can bidder 1 be better of reporting something other than its true valuation? The answer is yes. By reporting its true valuation, bidder 1 is allocated nothing and receives a surplus of zero. Suppose, instead, that bidder 1 reports $\xi_{1,AB}=5$. The mechanism calculates the optimal allocation to be the one in which bidder 1 receives AB, and a supporting payment lattice $\underline{\pi}^*=(2,2,2)$. Thus, by not reporting its true valuations, bidder 1 receives a surplus of 1. In fact, this holds for any $\xi_{1,ab} \geq 4$.

Now let's turn to the sealed-bid bundle auction where k=1. This pricing strategy would discourage manipulations like the one above, because bidder 1 would be forced to pay 5. However, like the standard sealed-bid first-price auction, it suffers from potential efficiency losses due to strategic behavior. This can be seen in the example in Table 1 in which bidder 1 has an incentive to bid $2+\epsilon$. If the bidder's information is imperfect, it risks underbidding and losing the good.

Ascending k=1—Bundle Auction (A1BA)

A mechanism of the present invention called the ascending k-bundle auction where k=1 (A1BA) is now introduced. A1BA accepts bids on bundles, and computes a tentative optimal allocation and a quote, in the form of the payment lattice, by using the k-bundle payment procedure. ALBA applies the ascending rule and the beat-the-quote rule. The combination of these rules requires that bidder i's new offer on bundle b satisfies $\hat{\xi}_{i,b} \geq \max(\pi_b, \xi_{i,b})$ for all b, and $\xi_{i,b} \geq \max(\pi_b \xi_{i,b})\alpha\delta$ for at least one b. The auction may clear or end when a period of bidding inactivity transpires.

As a practical matter, rather than having a bidder specify a valuation for every member of the lattice in each offer, the auction computer stores the bidder's previous bids (beginning at zero) and the bidder's message is treated as an update. It is assumed that the auctioneer (i.e. auction computer) interprets these updates in a manner consistent with the assumption of monotone valuations. If bidder i increases its offer on b, the auction ensures that i's offer is raised on all $c \supset b$. Formally, for $c \supset b$, $$\hat{\xi}_{i,c} = \max(\xi_{i,c}, \hat{\xi}_{i,b}).$$

For example, if the bidder first bid $\xi_{i,ABC}=\$5$, and then bid $\xi_{i,AB}=\$10$, the auctioneer will consider the bidder's current bid on ABC to be $\xi_{i,ABCl}=\$10$.

The auction begins with a quote in which each payment on the lattice is zero. Thereafter, it calculates a new payment lattice or winning bids each time a bid is admitted or when price quotes are triggered. With k=1, the quote is the payment lattice $\bar{\pi}^*$ computed from the current set of bids. Because of the manner in which the payments are determined, the bidder knows it is winning the bundle that maximizes $\xi_{i,b} - \pi_b$. However, if more than one bundle satisfies this condition, the bidder may not be able to tell from among these which one it is winning. To remedy this, the auction computer informs each bidder which bundle, if any, it is tentatively winning.

The auction may clear and close after no new bids are received within a specified period (inactivity-based clear).

Because participants can bid on bundles in A1BA, they do not suffer from the exposure problem in which they are reluctant to express their true valuation for a bundle when they need to purchase the elements individually. However, there is still an incentive for a bidder to free ride. It is unclear whether the threat of the auction closing while two bidders play "chicken" is enough to avoid the free rider problem.

The auction design is directly applicable to situations where bids are restricted in order to admit polynomial time algorithms for computing f* (Rothkopf et al. 1998). Even without such restrictions, when bids are sparse, the computation of the efficient allocation can be cast as a straightforward search problem, and recent experimentation has found that problems with thousands of (superadditive) bundle bids can be solved in this manner (Fujishima et al. 1999; Sandholm, 1999). The resulting allocation is locally efficient, and the k=1 payments are separated with respect to the bids received. The auction needs to announce prices on only those bundles that have received bids, since the bidders can easily perform the inference to determine minimal payments for the rest of the bundles.

In summary, the invention provides a new combinatorial auction mechanism that is (1) iterative, (2) progressive, and (3) based on clearing prices. Each of these features has advantages:

Iterative. In contrast to the one-shot sealed-bid approach, an iterative mechanism proceeds in multiple stages. At each stage, bidders must submit offers, the mechanism performs some computation based on these offers, and reports back some summary information to the bidders. The bidders then use this information to prepare their next bids. The advantage of an iterative approach is that bidders need not prepare bids for every combination of goods of potential interest; rather they can wait to see based on the feedback which combinations are likely to be relevant. Since combinatorial auctions by definition potentially involve a combinatorial number of potential bundles, this can lead to a tremendous saving of effort for the bidders.

Progressive. Bidding rules require that each iteration's bids be an improvement (in a well defined sense) over the previous. This promotes steady progress toward the final result, eliminating the possibility of oscillation or deadlock. The process ends when no participant chooses to submit a new bid.

Based on Clearing Prices. The form of the feedback on each iteration is a set of equilibrium prices supporting the optimal allocation based on the bids received thus far. What this means is that at the given prices, each bidder gets the bundle that would offer it the greatest surplus over its stated offer, and this allocation also yields the greatest total surplus. Prices are anonymous, which means that every bidder faces the same prices. The bidders then use these prices to drive their subsequent bids, typically choosing to bid on bundles that appear even more advantageous at the given prices. Thus approach also ensures that the end result is stable, in that no bidder would prefer some other bidders' allocation (or any other bundle) at the final prices.

Several variations of the basic process are possible, incorporating the core invention. Some examples include:
1. The method can include additional bidding rules, such as activity rules requiring bidders to maintain winning bids in order to remain active in the auction. Such additional rules do not change the basic structure of the process or the central price calculations.
2. Requiring that offers beat price quotes and/or previous offers by a fixed minimal price increment, rather than just requiring that they beat them by any amount.
3. A "continuous" version of the auction can be accomplished by triggering price quotes by a single newly received bid.
4. Alternative pricing calculations. There may be other reasonable ways to set prices that do not violate the equilibrium or monotonicity conditions. They obviously place a higher price on unallocated bundles (because the process mentioned produces the lowest prices).

While the best mode for carrying out the invention has been described in detail, those familiar with the art to which this invention relates will recognize various alternative designs and embodiments for practicing the invention as defined by the following claims.

What is claimed is:

1. A method for conducting a progressive, price-driven, combinatorial auction of items over a communications network, the method comprising:
   (a) receiving at a computer site bids for the items being auctioned from a plurality of bidders wherein each of the bids represents at least one bundle of items and at least one associated offer price;
   (b) calculating an interim allocation of bundles to the bidders that maximizes or approximates a total value of winning bids;
   (c) calculating an interim winning price for each bundle in the interim allocation based on a k-bundle price algorithm which ensures that the bidders can determine whether they are winning the auction from the interim winning prices;
   (d) transmitting the interim allocation and the interim winning prices to the bidders;
   (e) receiving upwardly-revised bids from the bidders at the computer site in response to step (d);

(f) calculating a revised, interim allocation of bundles to the bidders and a revised, interim winning price for each bundle in the revised, interim allocation based on the revised bids;

(g) transmitting the revised, interim allocation and the revised, interim winning prices to the bidders;

(h) repeating steps (e) through (g) until a termination criterion is satisfied; and (i) declaring the last revised, interim allocation and the last revised, interim winning prices as an auction result after termination of the bidding process.

2. The method as claimed in claim 1 further comprising:

determining interim prices for one or more unallocated bundles based on the k-bundle price algorithm; and transmitting the interim prices for the one or more unallocated bundles to the bidders.

3. The method as claimed in claim 1 wherein the items are products.

4. The method as claimed in claim 1 wherein the items are services.

5. The method as claimed in claim 1 wherein the items include at least one product and at least one service.

6. The method as claimed in claim 1 wherein the computer site is a Web site.

7. The method as claimed in claim 1 wherein the auction ends a fixed period of time after the auction begins.

8. The method as claimed in claim 1 wherein the auction ends an undetermined period of time after the auction begins.

9. The method as claimed in claim 1 wherein the step of calculating an interim winning price for each bundle in the interim allocation includes the step of constructing an instance of the assignment problem.

10. The method as claimed in claim 1 wherein the computer site comprises a server and at least one of steps (b), (c) and (f) is performed using the server.

11. The method as claimed in claim 2 wherein a server at the computer site determines and transmits the interim prices.

12. A computer system for conducting a progressive, price-driven, combinatorial auction of items over a communications network, the computer system comprising:

a set of related documents and associated files; and a server for serving up the set of related documents and associated files to a plurality of I/O devices to provide bidders with capability to participate in the auction, the server being programmed with application software to:

(a) receive bids for the items being auctioned from a plurality of bidders wherein each of the bids represents at least one bundle of items and at least one associated offer price;

(b) calculate an interim allocation of bundles to the bidders that maximizes or approximates a total value of winning bids;

(c) calculate an interim winning price for each bundle in the interim allocation based on a k-bundle price algorithm which ensures that the bidders can determine whether they are winning the auction from the interim winning prices;

(d) transmit the interim allocation and the interim winning prices to the bidders;

(e) receive upwardly-revised bids from the bidders at the server in response to step (d);

(f) calculate a revised, interim allocation of bundles to the bidders and a revised, interim winning price for each bundle in the revised, interim allocation based on the revised bids;

(g) transmit the revised, interim allocation and the revised, interim winning prices to the bidders;

(h) repeat (e) through (g) until a termination criterion is satisfied; and (i) declare the last revised, interim allocation and the last revised, interim winning prices as an auction result after termination of the bidding process.

13. The computer system as claimed in claim 12 wherein the server is further programmed to:

determine interim prices for one or more unallocated bundles based on the k-bundle price algorithm; and transmit the interim prices for the one or more unallocated bundles to the bidders.

14. The computer system as claimed in claim 12 wherein the items are products.

15. The computer system as claimed in claim 12 wherein the items are services.

16. The computer system as claimed in claim 12 wherein the items include at least one product and at least one service.

17. The computer system as claimed in claim 12 wherein the computer site is a Web site.

18. The computer system as claimed in claim 12 wherein the auction ends a fixed period of time after the auction begins.

19. The computer system as claimed in claim 12 wherein the auction ends an undetermined period of time after the auction begins.

20. The computer system as claimed in claim 12 wherein the server calculates an interim winning price for each bundle in the interim allocation by constructing an instance of the assignment problem.

\* \* \* \* \*